(12) United States Patent
Kinomura et al.

(10) Patent No.: US 9,278,624 B2
(45) Date of Patent: Mar. 8, 2016

(54) VEHICLE

(75) Inventors: Shigeki Kinomura, Toyota (JP); Shinji Ichikawa, Toyota (JP); Tomoyuki Mizuno, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 162 days.

(21) Appl. No.: 14/115,152

(22) PCT Filed: May 27, 2011

(86) PCT No.: PCT/JP2011/062210
§ 371 (c)(1),
(2), (4) Date: Nov. 1, 2013

(87) PCT Pub. No.: WO2012/164644
PCT Pub. Date: Dec. 6, 2012

(65) Prior Publication Data
US 2014/0091764 A1    Apr. 3, 2014

(51) Int. Cl.
*H02J 7/00* (2006.01)
*B60L 11/18* (2006.01)

(52) U.S. Cl.
CPC ......... *B60L 11/1811* (2013.01); *B60L 11/185* (2013.01); *B60L 11/1818* (2013.01); *B60L 11/1824* (2013.01); *H02J 7/0055* (2013.01); *Y02T 10/7005* (2013.01); *Y02T 90/121* (2013.01); *Y02T 90/128* (2013.01); *Y02T 90/14* (2013.01)

(58) Field of Classification Search
CPC ........................................................ H02J 7/0027
USPC ............................................................ 320/109
See application file for complete search history.

(56) References Cited

U.S. PATENT DOCUMENTS

| | | | |
|---|---|---|---|
| 5,545,046 A | 8/1996 | Masuda et al. | |
| 8,035,247 B2 * | 10/2011 | Ichikawa | 307/10.1 |
| 8,427,103 B2 * | 4/2013 | Ohtomo | 320/109 |
| 2002/0070705 A1 * | 6/2002 | Buchanan et al. | 320/116 |
| 2004/0130292 A1 * | 7/2004 | Buchanan et al. | 320/116 |
| 2008/0143290 A1 * | 6/2008 | Chavakula | 320/101 |
| 2009/0039831 A1 * | 2/2009 | Ichikawa | 320/118 |
| 2009/0079389 A1 * | 3/2009 | Ohtomo | 320/109 |
| 2010/0270860 A1 | 10/2010 | Kamaga | |
| 2010/0289457 A1 * | 11/2010 | Onnerud et al. | 320/162 |
| 2011/0227531 A1 * | 9/2011 | Rajakaruna | 320/109 |
| 2012/0049792 A1 * | 3/2012 | Crombez | 320/109 |
| 2012/0249065 A1 * | 10/2012 | Bissonette et al. | 320/109 |

(Continued)

FOREIGN PATENT DOCUMENTS

| | | |
|---|---|---|
| EP | 2 039 570 A2 | 3/2009 |
| FR | 2 942 087 A1 | 8/2010 |

(Continued)

*Primary Examiner* — Suchin Parihar
(74) *Attorney, Agent, or Firm* — Oliff PLC

(57) ABSTRACT

A vehicle is capable of charging a power storage device mounted thereon using electric power from two power paths of an external DC power supply and AC power supply. The vehicle includes a DC charger for converting electric power from the DC power supply into charging electric power for the power storage device, and an AC charger for converting electric power from the AC power supply into charging electric power for the power storage device. A vehicle ECU selects an electric power path to be used for charging based on the state of the power storage device and efficiency of the DC charger and the AC charger.

18 Claims, 14 Drawing Sheets

(56) References Cited

U.S. PATENT DOCUMENTS

| | | | |
|---|---|---|---|
| 2013/0020993 A1* | 1/2013 | Taddeo et al. | 320/109 |
| 2013/0039104 A1* | 2/2013 | Sharma | 363/123 |
| 2013/0086409 A1* | 4/2013 | Lu et al. | 713/340 |
| 2013/0113413 A1* | 5/2013 | Harty | 320/101 |
| 2013/0134908 A1* | 5/2013 | Sugiyama et al. | 318/3 |
| 2014/0035530 A1* | 2/2014 | Shao | 320/109 |
| 2014/0084862 A1* | 3/2014 | Kawaguchi et al. | 320/108 |
| 2014/0111139 A1* | 4/2014 | Chen et al. | 320/107 |
| 2014/0167694 A1* | 6/2014 | Gjinali et al. | 320/109 |
| 2014/0222271 A1* | 8/2014 | Merten et al. | 701/22 |
| 2015/0054469 A1* | 2/2015 | Jang et al. | 320/162 |
| 2015/0069970 A1* | 3/2015 | Sarkar et al. | 320/109 |

FOREIGN PATENT DOCUMENTS

| | | |
|---|---|---|
| JP | U-61-126743 | 8/1986 |
| JP | A-2008-109782 | 5/2008 |
| JP | 2008-199780 A | 8/2008 |
| JP | A-2009-77557 | 4/2009 |
| JP | A-2009-171713 | 7/2009 |
| JP | A-2010-213535 | 9/2010 |
| JP | A-2011-120395 | 6/2011 |

\* cited by examiner

FIG.6
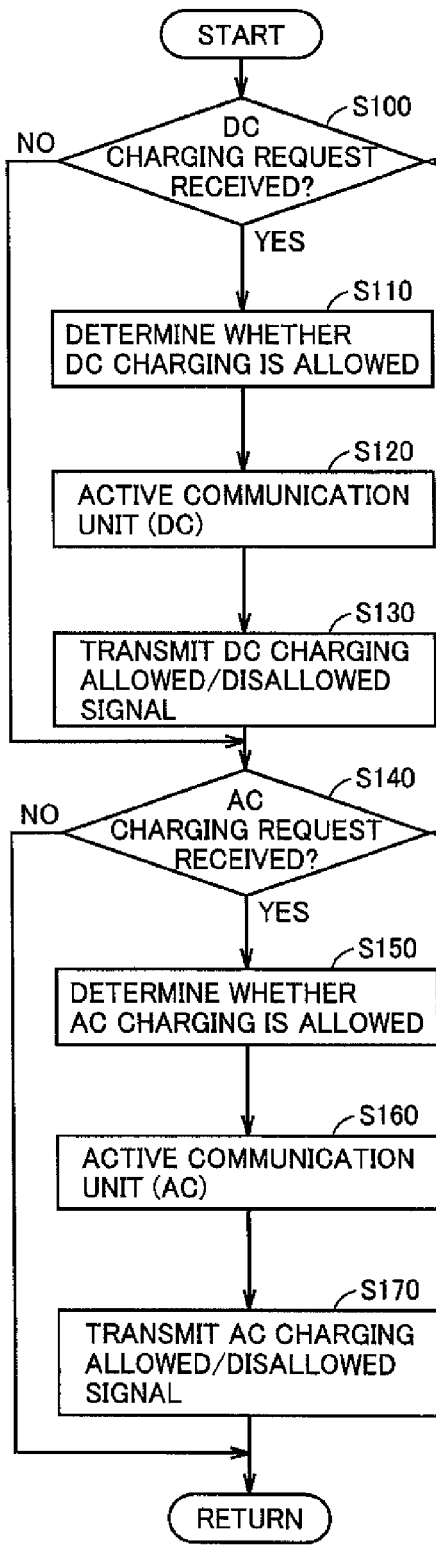
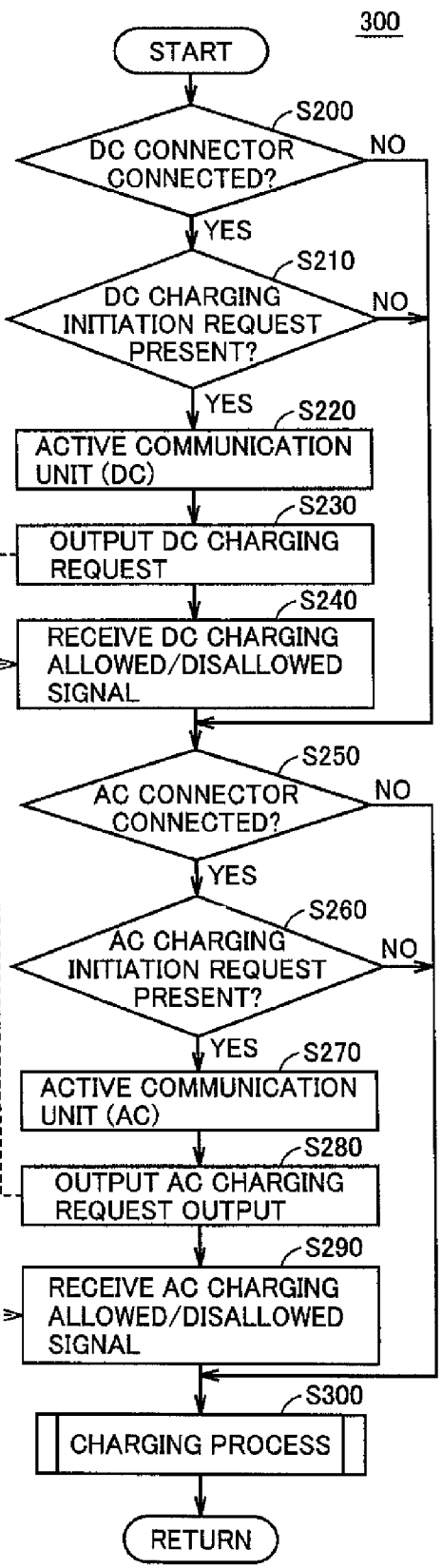

FIG.10
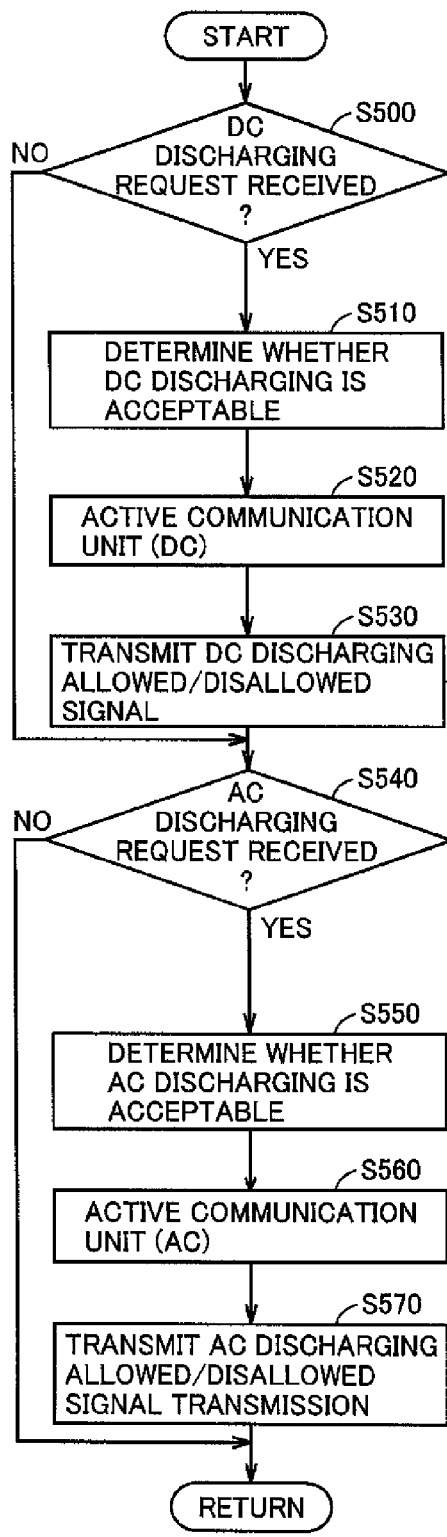
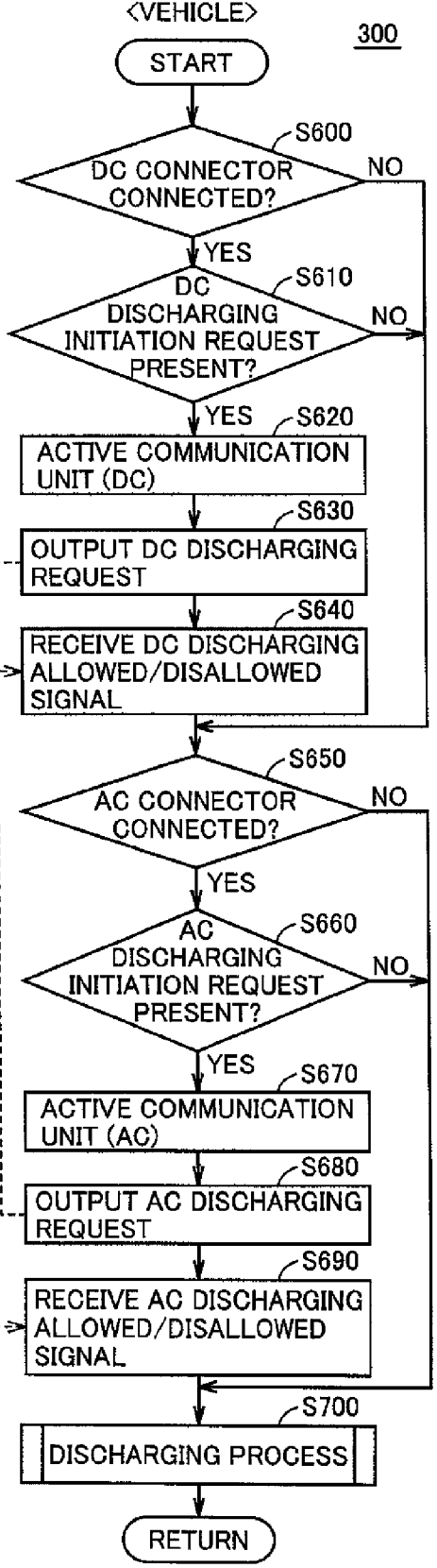

FIG.15

| Utilized | | AC Port | DC Port | Advantage | Condition of Selection |
|---|---|---|---|---|---|
| Charging Mode | Pattern 1 | Used | Used | • Reduction in charging time (charging speed increased) | • Basic Pattern<br>• When charging time is to be shortened<br>• When DC suppliable electric power is restricted by charger and/or cable |
| | Pattern 2 | Not Used | Used | • Charging efficiency improved when DC supply power is not restricted | • Power feeding capability < vehicle charger rating<br>• SOC ≤ α %<br>(• When lacking AC charging function at power feed device side) |
| | Pattern 3 | Used | Not Used | • Charging efficiency improved when at low power feeding | • SOC > α %<br>(• When lacking DC charging function at power feed device side) |
| Discharging Mode | Pattern 1 | Used | Used | • Usable as emergency AC power supply at the time of disaster or the like<br>• Coordination with home-directed DC electric distribution system allowed | • Basic Pattern |
| | Pattern 2 | Not Used | Used | • Coordination with home-directed DC electric distribution system allowed | • When AC power cannot be received at power receiving side |
| | Pattern 3 | Used | Not Used | • Usable as emergency AC power supply at the time of disaster or the like | • When DC power cannot be received at power receiving side |
| Charging/ Discharging Mode | Pattern 1 | Charging | Discharging | • DC discharging continuing time can be increased | |
| | Pattern 2 | Discharging | Charging | • Usable as AC power supply device employing DC power supply (solar cell panel, battery) at the time of commercial power supply electrical outage | |

VEHICLE

TECHNICAL FIELD

The present invention relates to a vehicle, more particularly, charging control using electric power from an external power supply for a power storage device mounted on a vehicle.

BACKGROUND ART

As an environment-friendly vehicle in recent years, attention is focused on a vehicle that has a power storage device (for example, secondary battery, capacitor, or the like) mounted and that runs by the driving force generated from the electric power stored in the power storage device. Such a vehicle includes, for example, an electric vehicle, a hybrid vehicle, a fuel cell vehicle, and the like. There is proposed the technique to charge a power storage device mounted on such vehicles by a commercial power supply of high power generation efficiency.

Some hybrid vehicles are known to allow charging of a vehicle-mounted power storage device using electric power from a power supply external to the vehicle (hereinafter, also simply referred to as "external power supply"), likewise with an electric vehicle (hereinafter, also referred simply to as "external charging"). For example, there is known the so-called "plug-in hybrid vehicle" that allows charging of the power storage device from a general household power supply by connecting a receptacle outlet provided at a residence with a charging inlet provided at the vehicle through a charging cable. This is expected to improve the fuel consumption efficiency of a hybrid vehicle.

However, the AC power of a commercial power supply at home is generally approximately AC 100V or AC 200V, and the electric power capacity is restricted. Therefore, a long period of time such as several hours is required to sufficiently charge a power storage device. In recent years, the development of a dedicated high-speed charger is in progress for the purpose of charging a power storage device of a vehicle in a short period of time such as in several ten minutes.

Japanese Patent Laying-Open No. 2009-77557 (PTD 1) discloses charging control in an electric vehicle including a connector for high speed charging and a connector for normal charging, corresponding to the case where a high speed charger and a commercial power supply are simultaneously connected to the high speed charging connector and normal charging connector, respectively, at the vehicle body. Japanese Patent Laying-Open No. 2009-77557 (PTD 1) discloses the issue of preventing simultaneous high speed charging and normal charging by charging the power storage device using the electric power of the power supply that has been connected to the connector first, or using electric power of the power supply employed in the charging scheme having a shorter total charging time among the high speed charging and normal charging.

CITATION LIST

Patent Document

PTD 1: Japanese Patent Laying-Open No. 2009-77557
PTD 2: Japanese Patent Laying-Open No. 2008-109782
PTD 3: Japanese Utility Model Laying-Open No. S61-126743
PTD 4: Japanese Patent Laying-Open No. 2010-213535
PTD 5: Japanese Patent Laying-Open No. 2009-171713

SUMMARY OF INVENTION

Technical Problem

According to the charging device disclosed in Japanese Patent Laying-Open No. 2009-77557 (PTD 1), the power supply connected first or the power supply with a shorter charging time is selected. Therefore, the power supply to be used for charging must be selected at the time of initiating charging even in the case where the charging time cannot be readily estimated due to voltage variation and the like of the selected power supply. Therefore, the charging thereof is not necessarily performed efficiently.

Furthermore, the charging device disclosed in Japanese Patent Laying-Open No. 2009-77557 (PTD 1) executes charging until the charging is completed by the power supply selected at the time of initiating charging. Therefore, even in the case where charging using a power supply not selected is more efficient, there is a possibility of the charging being carried out using the initially selected power supply to the end.

In view of the foregoing, an object of the present invention is to efficiently charge a power storage device of a vehicle capable of external charging using electric power from two power paths.

Solution to Problem

A vehicle according to the present invention includes first and second power conversion devices, and a control device, and is capable of charging a power storage device mounted thereon using electric power from two power paths of an external DC power supply and AC power supply. The first power conversion device converts the electric power from the DC power supply into charging electric power for the power storage device. The second power conversion device converts electric power from the AC power supply into charging electric power for the power storage device. The control device controls the first power conversion device and the second power conversion device. The control device selects the electric power path to be used for charging based on the state of the power storage device and efficiency of the first power conversion device and second power conversion device.

Preferably, the first power conversion device has a rating capacity greater than the rating capacity of the second power conversion device.

Preferably, the control device selects the electric power path such that charging is performed using electric power from at least the DC power supply when the state of charge of the power storage device is lower than a predetermined threshold value, and such that charging is performed using electric power from the AC power supply when the state of charge exceeds the threshold value.

Preferably, when the state of charge is lower than the threshold value, the control device performs charging using both the electric power from the DC power supply and the electric power from the AC power supply.

Preferably, the control device selects the electric power path such that charging is performed using electric power from at least the DC power supply when acceptable charging power for the power storage device exceeds a predetermined threshold value, and such that charging is performed using electric power from the AC power supply when the acceptable charging power is lower than the threshold value.

Preferably, the control device performs charging using electric power from both the DC power supply and the AC power supply when the acceptable charging power exceeds the threshold value.

Preferably, electric power is supplied from a power feed device including the DC power supply and the AC power supply. The control device can transmit/receive information to/from the power feed device. The control device selects an electric power path such that charging is performed using electric power from the AC power supply in addition to the electric power from the DC power supply, when a value indicating electric power feeding capability of the power feed device included in the information received from the power feed device exceeds the rating capacity of the first power conversion device.

Preferably, the control device transmits/receives information to/from the power feed device through an information transmission path using communication and an information transmission path using cable differing from the information transmission path using communication.

Preferably, the information transmission using communication is performed using a power line communication (PLC).

Preferably, the information transmission using communication is performed using wireless communication.

Preferably, information transmission from the vehicle to the power feed device is conducted through the information transmission path using the cable, whereas information transmission from the power feed device to the vehicle is conducted through the information transmission path using communication.

Preferably, the electric power from the DC power supply and AC power supply is transmitted via an electric power cable. The vehicle further includes a connection portion for connecting a connector of the electric power cable. The connection portion includes a DC port for receiving electric power from the DC power supply and an AC port for receiving electric power from the AC power supply.

Preferably, the connector is formed including a first terminal group for transmitting electric power from the DC power supply and a second terminal group for transmitting electric power from the AC power supply. By connecting the connector with the connection portion, the first terminal group and the second terminal group are electrically connected to the DC port and the AC port, respectively.

Preferably, the vehicle is further capable of supplying the electric power from the power storage device to a device external to the vehicle. The first power conversion device is configured to convert the electric power from the power storage device to allow supply of DC power to an external device. The second power conversion device is configured to convert the electric power from the power storage device to allow supply of AC power to an external device.

Preferably, the control device uses electric power from the DC power supply to charge the power storage device, and uses the second power conversion device to convert the electric power from the power storage device, and supplies AC power to an external device.

Preferably, the control device uses electric power from the AC power supply to charge the power storage device, and uses the first power conversion device to convert electric power from the power storage device, and supplies DC electric power to an external device.

Advantageous Effects of Invention

According to the present invention, a power storage device can be charged efficiently at a vehicle capable of external charging using electric power from two electric power paths.

BRIEF DESCRIPTION OF DRAWINGS

FIG. 6 is a flowchart to describe in detail a charge control process executed at a charging station and vehicle according to the first embodiment.

FIG. 10 is a flowchart to describe in detail a discharge control process executed at a charging station and vehicle in the second embodiment.

FIG. 15 represents each utilized case and summary of the feature thereof.

DESCRIPTION OF EMBODIMENTS

Figure 1:
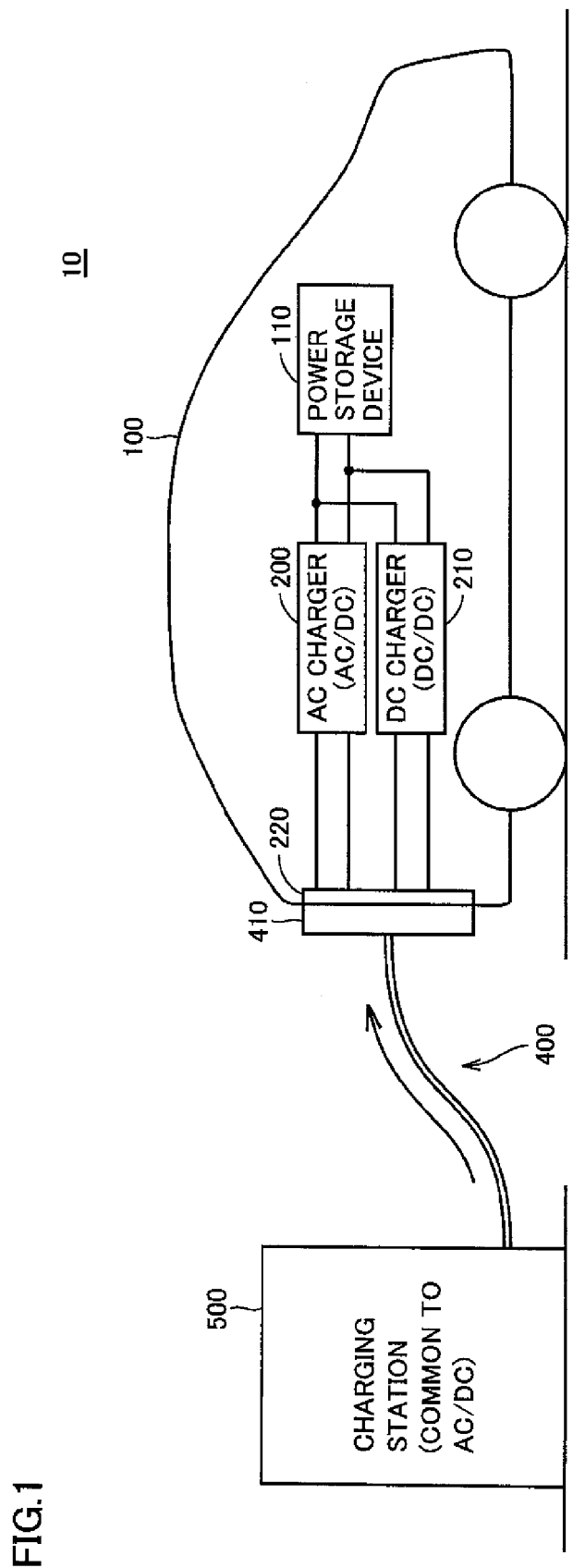
FIG. 1 is a diagram to schematically describe an electric power supply system including a vehicle according to a first embodiment.

Embodiments of the present invention will be described in detail with reference to the drawings. In the drawings, the same or corresponding elements have the same reference characters allotted, and description thereof will not be repeated.

First Embodiment

FIG. 1 is a diagram to schematically describe an electric power supply system 10 including a vehicle 100 according to the first embodiment. Referring to FIG. 1, electric power supply system 10 includes a vehicle 100, an electric power cable 400, and a charging station 500 that is a power feed device.

Charging station 500 can supply electric power from both DC power supply and AC power supply to vehicle 100 via electric power cable 400. Electric power cable 400 includes a connector 410 at its end for connecting to vehicle 100. Connector 410 is connected to an inlet 220 that is the connection power provided at the surface of vehicle 100.

Figure 2:
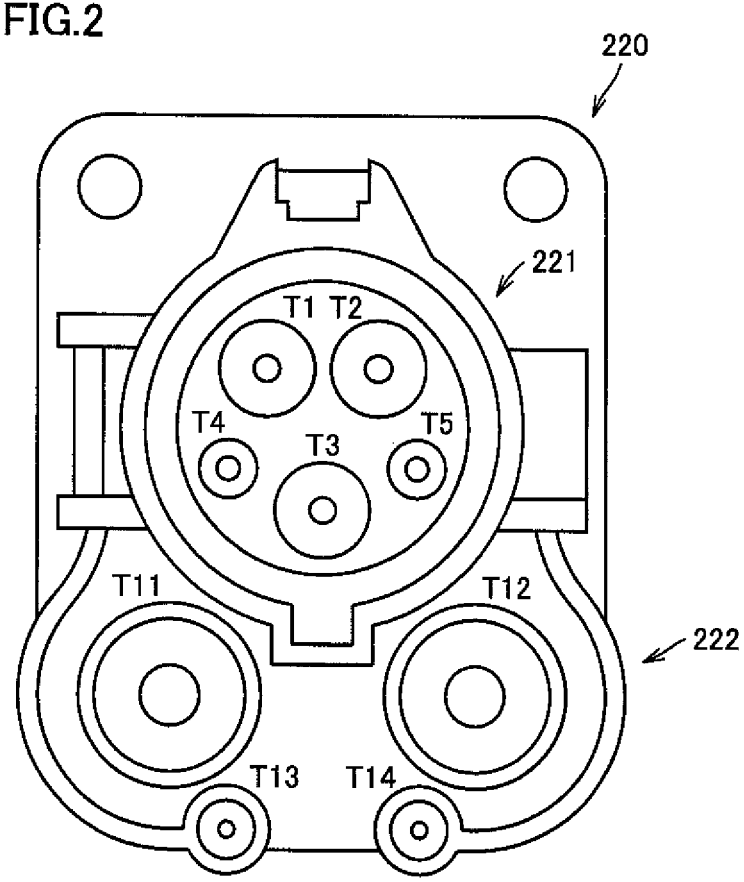
FIG. 2 is a schematic view of the inlet of FIG. 1.

FIG. 2 is a schematic view of an example of inlet 220. In the first embodiment, inlet 220 takes an integral configuration of an AC port 221 for receiving AC power and a DC port 222 for receiving DC power. Connector 410 of electric power cable 400 has a shape corresponding to inlet 220. The configuration of inlet 220 is not limited to that shown in FIG. 2, and may take a configuration in which an inlet corresponding to AC port 221 and an inlet corresponding to DC port 222 are provided individually.

Referring to FIG. 2, AC port 221 includes power terminals T1 and T2 for transmitting AC power, a ground terminal T3, and communication terminals T4 and T5. DC port 222 includes power terminals T11 and T12 for transmitting DC power, and communication terminals T13 and T14. The connection of connector 410 in electric power cable 400 with inlet 220 causes a corresponding terminal in connector 410 to be electrically connected to the respective terminals T1-T5 and T11-T14 set forth above. Accordingly, supply of electric power from charging station 500 to vehicle 100 and signal transmission between charging station 500 and vehicle 100 are allowed. The type, number and arrangement of the terminals in FIG. 2 are by way of example only, and may take another configuration.

Referring to FIG. 1 again, vehicle 100 further includes, in addition to inlet 220, a power storage device 110, as well as an AC charger 200 and a DC charger 210 that are power conversion devices.

AC charger 200 converts AC power received at inlet 220 into DC power for charging power storage device 110. DC charger 210 converts the DC power received at inlet 220 into a voltage suitable for charging power storage device 110, and then charges power storage device 110 with the voltage.

Charging using AC power (hereinafter, also referred to as "AC charging") is a charging scheme intended to charge power storage device 110 using a commercial power supply (AC 100V or AC 200V). Therefore, there is an advantage that charging of power storage device 110 is allowed at home. However, since the AC power that can be received at vehicle 100 is restricted generally by the rating power capacity of the commercial power supply, a period of time of approximately several hours is required to charge power storage device 110 sufficiently.

In contrast, charging using DC power (hereinafter, also referred to as "DC charging") is a charging scheme intended to charge power storage device 110 in a short period of time, i.e., the so-called high speed charging. Therefore, the DC power supplied to vehicle 100 is generally set to have a power capacity sufficiently greater than that of the aforementioned AC power. In association, the rating capacity of DC charger 210 greater than that of AC charger 200 is employed.

Figure 3:
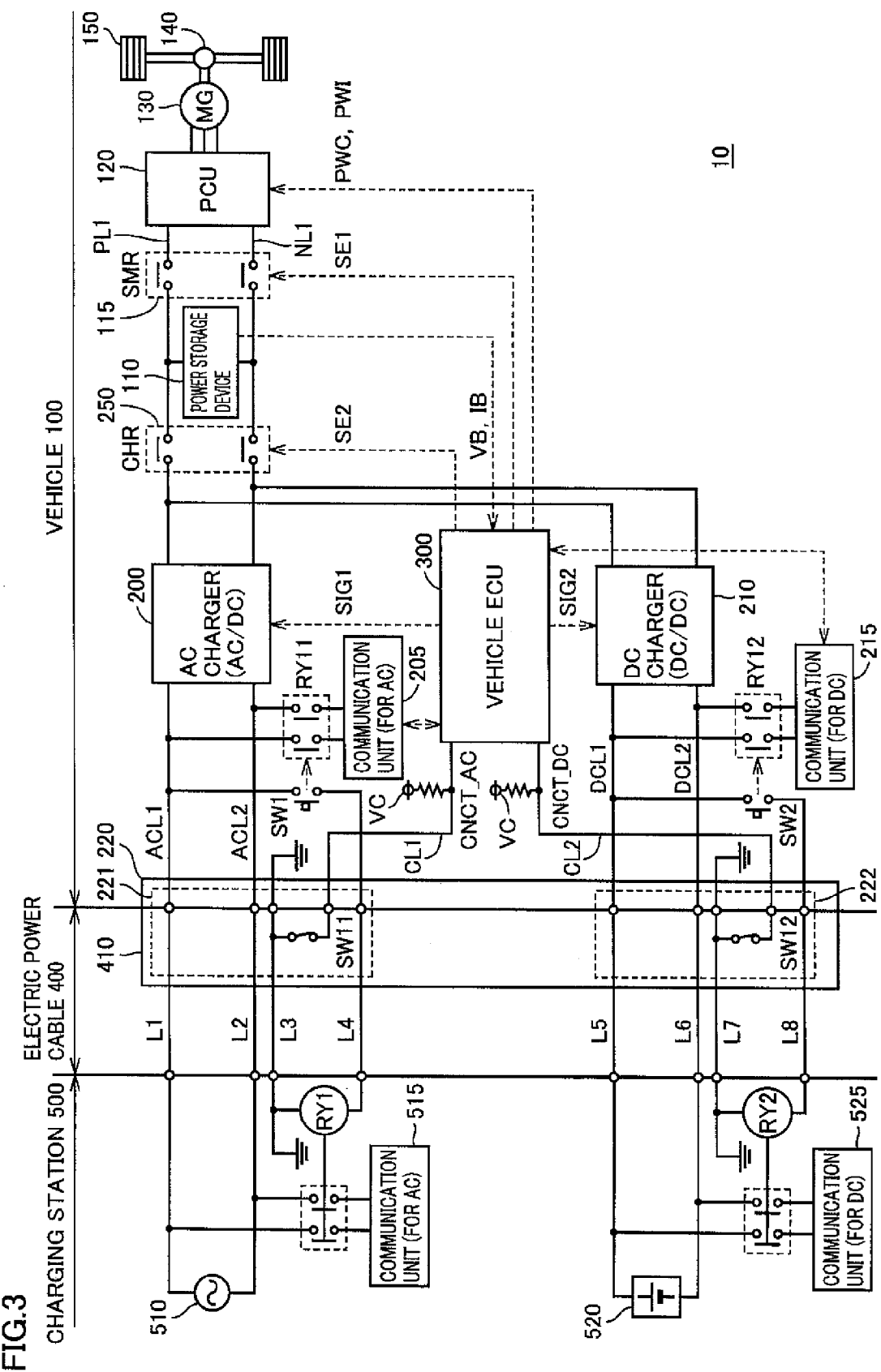
FIG. 3 is an entire block diagram of an electric power supply system including a vehicle according to the first embodiment.

The configuration of electric power supply system 10 in FIG. I will be described in further detail with reference to FIG. 3. FIG. 3 is an entire block diagram of electric power supply system 10 including vehicle 100 according to the first embodiment.

Referring to FIG. 3, vehicle 100 includes, as the configuration for driving vehicle 100, a power storage device 110, a system main relay (SMR) 115, a PCU (Power Control Unit) 120 that is a driving device, a motor generator 130, a power transmission gear 140, a driving wheel 150, and a vehicle ECU (Electronic Control Unit) 300 that is a control device.

Power storage device 110 is an electric power reservoir element configured to allow charging and discharging. Power storage device 110 is configured including a secondary battery such as a lithium ion battery, nickel-metal hydride battery, or lead battery, or a power storage element such as an electric double layer capacitor.

Power storage device 110 is connected to PCU 120 via power lines PL1 and NL1. Power storage device 110 supplies electric power to PCU 120 for generating the driving force of vehicle 100. Power storage device 110 also stores electric power generated at motor generator 130. Power storage device 110 provides a power output of approximately 200V, for example.

Although not shown, power storage device 110 has a voltage sensor and current sensor provided for detecting the voltage and input/output current of power storage device 110. Detected voltage VB and current IB are output to vehicle ECU 300. Vehicle ECU 300 obtains the state of charge (hereinafter, also referred to as SOC) of power storage device 110 based on such detected values.

The relay in SMR 115 is connected between power storage device 110 and power lines PL1, NL1. SMR 115 switches between supply and cut off of electric power between power storage device 110 and PCU 120 based on a control signal SE1 from vehicle ECU 300.

Although not shown, PCU 120 is configured including a converter to boost the power supply voltage from power storage device 110 and an inverter for converting the DC power boosted by the converter into AC power for driving motor generator 130, and the like.

Such converter and inverter are controlled by control signals PWC and PWI, respectively, from vehicle ECU 300.

Motor generator 130 is an AC rotating electric machine, for example a permanent magnetic type synchronous electric motor including a rotor in which a permanent magnet is embedded.

The output torque from motor generator 130 is transmitted to driving wheel 150 via a power transmission gear 140 configured including a speed reducer and power split mechanism to cause vehicle 100 to run. During a regenerative braking operation of vehicle 100, motor generator 130 can generate power by the rotative force of driving wheel 150. The generated electric power is converted into the charging electric power for power storage device 110 by PCU 120

At a hybrid vehicle having an engine (not shown) mounted in addition to motor generator 130, the cooperative operation of the engine and motor generator 130 causes generation of the required vehicle driving force. In this case, motor generator 130 can also charge power storage device 110 using the electric power generated by the engine rotation.

Although FIG. 3 represents a configuration in which one motor generator is provided, the number of motor generators is not limited thereto. A configuration in which a plurality of motor generators are provided may be employed. For example, in the case of a hybrid vehicle including two motor generators, one of the motor generators may be used exclusively as an electric motor for driving wheel 150, and the other motor generator may be used exclusively as a power generator driven by the engine.

Vehicle ECU 300 includes a CPU (Central Processing Unit), a storage device, and an input/output buffer, all not shown in FIG. 3, to input a signal from each sensor and output a control signal to each device, as well as to control vehicle 100 and each device. The control thereof is not limited to processing by software, and may be processed by dedicated hardware (electronic circuit).

Vehicle ECU 300 obtains the state of charge (SOC) of power storage device 110 based on the detected value of voltage VB and current IB from the voltage sensor and current sensor (all not shown) in power storage device 110.

Vehicle ECU 300 generates and outputs a control signal for controlling PCU 120, SMR 115, and the like. Although FIG. 3 corresponds to a configuration in which only one vehicle ECU 300 is provided as a control device, a configuration may be employed in which a control device is provided individually for each function or for each control-subject apparatus such as a control device for PCU 120 and a control device for power storage device 110.

As a configuration in which power storage device 110 is charged by electric power supplied from charging station 500, vehicle 100 further includes communication units 205, 215, and a charging relay CHR 250, in addition to inlet 220, AC charger 200 and DC charger 210.

AC charger 200 is connected to AC port 221 of inlet 220 via power lines ACL1, ACL2. AC charger 200 is also connected to power storage device 110 via CHR 250.

The connection of connector 410 to inlet 220 causes the AC power from an AC power supply 510 included in charging station 500 to be transmitted onto power lines ACL1, ACL2 of vehicle 100 via power lines L1 and L2, respectively, of electric power cable 400. AC charger 200 is controlled by a control signal SIG1 from vehicle ECU 300 to convert the transmitted AC power into DC power for output to power storage device 110.

DC charger 210 is connected to DC port 222 of inlet 220 via power lines DCL1, DCL2. DC charger 210 is also connected to power storage device 110 via CHR 250.

Upon connection of connector 410 with inlet 220, the DC power from DC power supply 520 included in charging station 500 is transmitted to power lines DCL1, DCL2 of vehicle 100 via power lines L5, L6, respectively, of electric power cable 40. DC charger 210 is controlled by a control signal SIG2 from vehicle ECU 300 to convert the voltage of the transmitted DC power into a voltage suitable for charging power storage device 110 for output thereto.

CHR 250 is controlled by a control signal SE2 from vehicle ECU 300 to switch between supply and suppression of the charging electric power from AC charger 200 and DC charger 210 towards power storage device 110.

DC power supply 520 of charging station 500 may be a power storage device such as a battery, or have the electric power from the AC power supply converted into DC power by a rectifier or an AC/DC converter (both not shown).

Communication units 205 and 215 are devices for effecting communication with communication units 515 and 525, respectively, included in charging station 500. In the configuration of FIG. 3, communication units 205 and 515 communicate the information required for AC charging, whereas communication units 215 and 525 communicate information required for DC charging. Information is transmitted between communication units 205 and 515, and between communication units 215 and 525 through power line communication (PLC).

Communication unit 205 is connected to power lines ACL1 and ACL2 via a relay RY11. Relay RY11 is closed/opened by a user operating a switch SW1 for designating the start of a charging operation. Switch SW1 has one end connected to power line ACL1 and the other end connected to the exciting coil of relay RY1 at charging station 500 via communication line L4 of electric power cable 400. The operation of switch SW1 causes excitation of the exciting coil of relay RY1, such that the contact point is closed. Accordingly, communication unit 515 of charging station 500 is connected to a power line, allowing communication between communication units 205 and 515.

The same given above for communication units 205 and 515 also applies to communication units 215 and 525 on the part of direct current. Specifically, operation of switch SW2 causes relay RY12 on the part of vehicle 100 and relay RY2 on the part of charging station 500 to be closed such that communication between communication units 215 and 525 is allowed via the electric power path through which DC power is transmitted.

Communication units 205 and 215 can transmit/receive a signal to/from vehicle ECU 300. Communication units 205 and 215 receive from vehicle ECU 300 a signal to be transmitted for output to communication units 515 and 525, respectively. Communication units 205 and 215 output the signal received from communication units 515 and 525, respectively, to vehicle ECU 300.

Thus, by using together the transmission of a charging initiation signal through hard wire (cable) and transmission of information by responsive communication between charging station 500 and vehicle 100, the reliability of signal transmission/reception can be improved.

Connector 410 of electric power cable 400 is provided with a connection sensing unit to output a signal to indicate the connecting state of connector 410 for each of AC port 221 and DC port 222. A specific configuration of the connection sensing unit may take the form of switches SW11 and SW12, as shown in FIG. 3, for example. Alternatively, the form of a resistor (not shown) having a predetermined resistance may be employed.

Switch SW11 has one end connected to a common ground line L3 between charging station 500 and vehicle 100, and the other end connected to vehicle ECU 300 by a signal line CL1 through inlet 220. Switch SW1 electrically connects signal line CL1 with ground line L3 by appropriate connection of connector 410 with inlet 220. Voltage is applied to signal line CL1 from power supply node VC via a pull-up resistor. By such a configuration, signal line CL1 attains a potential determined by power supply node VC when connector 410 is not connected, and attains ground potential when connector 410 is connected. Vehicle ECU 300 determines whether connector 410 is appropriately connected to AC port 221 based on the potential of a connection signal CNCT_AC input through signal line CL1.

Switch SW12 has a configuration similar to that of switch SW11 set forth above. Therefore, detailed description thereof will not be repeated. Vehicle ECU 300 determines whether connector 410 is connected appropriately to DC port 222 based on the potential of a connection signal CNCT_DC input through signal line CL2.

Although FIG. 3 represents a configuration in which a communication unit for AC and a communication unit for DC are provided with regard to the communication between charging station 500 and vehicle 100, a configuration in which a common communication unit is employed for AC and for DC is allowed. Moreover, the communication scheme is not limited to the PLC communication as shown in FIG. 3. A configuration in which wireless communication, as shown in FIG. 4, may be employed.

Figure 4:
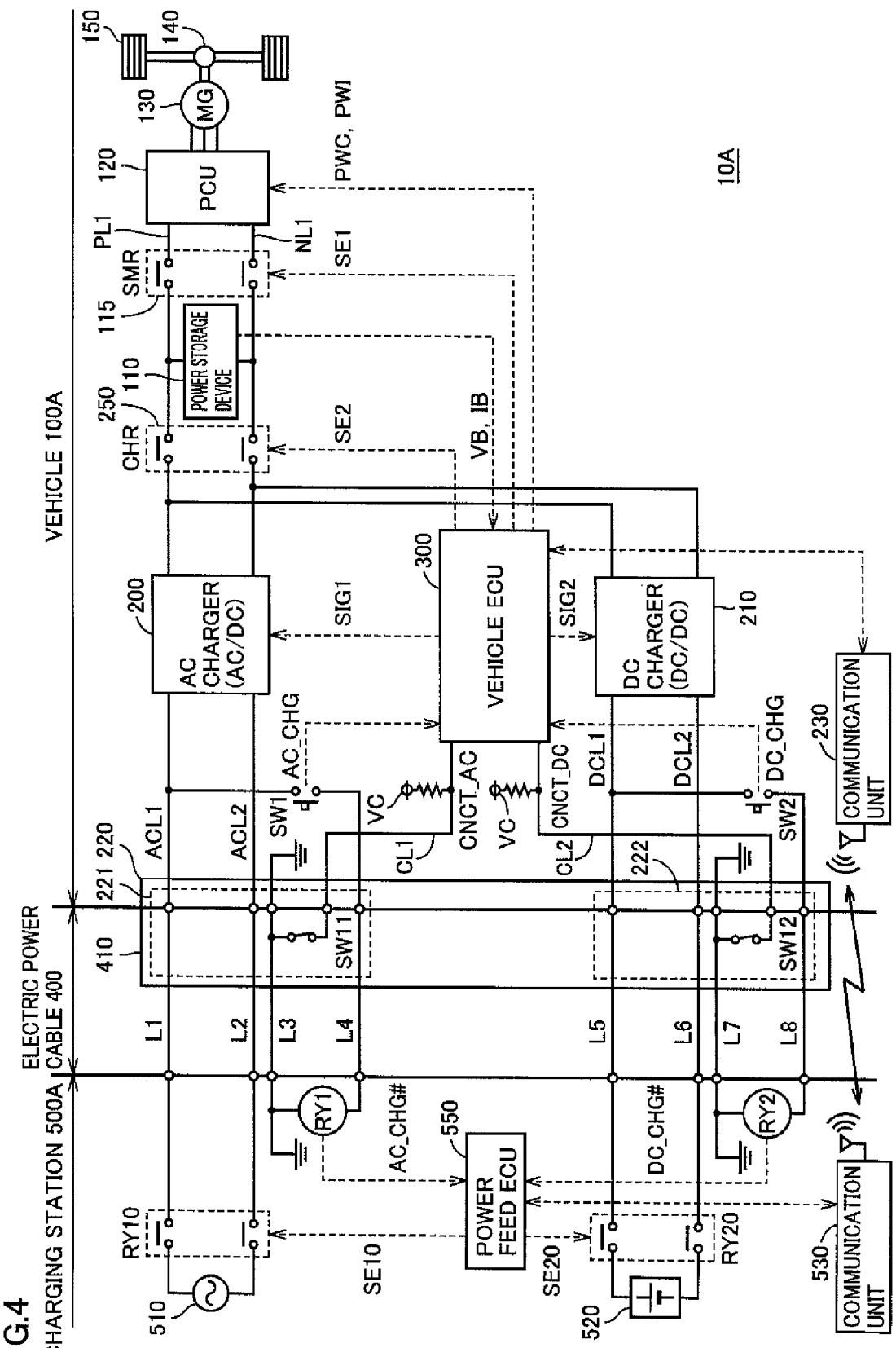
FIG. 4 is an entire block diagram of another example of an electric power supply system including a vehicle according to the first embodiment.

With regard to the communication unit in the example of FIG. 4, a communication unit 230 is provided on the part of vehicle 100A whereas a communication unit 530 is provided on the part of charging station 500A. Communication units 230 and 530 carry out wireless communication through infrared, electric wave, light, or the like. In this case, an operation signal AC_CHG of switch SW1 and an operation signal DC_CHG of switch SW2 are received by vehicle ECU 300. In response, communication unit 230 is activated by vehicle ECU 300, and executes communication with communication unit 530 on the part of charging station 500A.

At charging station 500A, signals AC_CHG# and DC_CHG# of relays RY1 and RY2 driven by the operation of switches SW1 and SW2 are received by a power feed ECU 550. Power feed ECU 550 responds to signals AC_CHG# and DC_CHG# to activate communication unit 530, and transmits/receives a signal to/from vehicle 100A via communication unit 530. Instead of providing power feed ECU 550, communication unit 530 may be activated directly by a signal from relays RY1 and RY2, as shown in FIG. 3.

In the example of FIG. 3, electric power is applied from charging station 500 to vehicle 100 for PLC communication even if charging is not executed on the part of vehicle 100. In the case where communication is effected without using a power line, as in FIG. 4, relays RY10 and RY20, for example, may be provided to cut the power supply to vehicle 100A when a charging operation is not actually performed.

In a vehicle that allows both AC charging and DC charging as in FIG. 3 or 4, it is necessary to determine which of the power supply is to be used for charging with the electric power.

Figure 5:
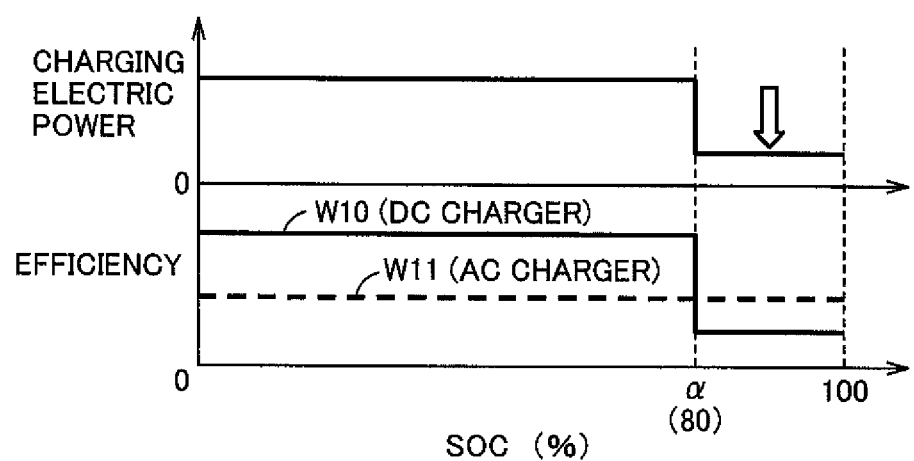
FIG. 5 is a diagram to describe the relationship of charging electric power and SOC with the charging efficiency of a DC charger and AC charger.

For example, FIG. 5 is a diagram to describe the relationship between charging electric power and SOC, and the charging efficiency of DC charger 210 and AC charger 200. When power storage device 110 is to be charged, there may be the case where the charging power that can be supplied to power storage device 110 is altered depending on the SOC of power storage device 110. Until the SOC reaches a predetermined reference value $\alpha$ (for example, 80%), charging is permitted using a great charging power. Upon exceeding reference value $\alpha$, the acceptable charging power is restricted low. This mainly depends on the acceptable property of the power storage device. For example, in the case of a lithium battery, the battery acceptable property will be degraded when the SOC approaches a fully-charging state. Therefore, charging corresponding to the supplied electric power cannot be implemented even if charging is performed with a great power.

Thus, for the purpose of high speed charging, DC charger 210 has the rating capacity set greater as compared to that of AC charger 200. When charging through great electric power, DC charger 210 will have a charging efficiency more favorable than that of AC charger 200. However, when the output electric power is restricted low, the charging efficiency will be degraded than when charging at great electric power, leading to the possibility of the charging efficiency becoming lower than that of AC charger 200 (line W10 in FIG. 5). Thus, in such a case where the charging power is restricted, it may be preferable to perform charging using AC charger 200 of smaller electric power than using DC charger 210 of great electric power, from the standpoint of charging efficiency.

Moreover, if the vehicle has the rating capacity of mounted DC charger 210 smaller than the total power feeding capability of AC power and DC power that can be supplied from charging station 500, there may be case where charging station 500 still has available power left even when charging using DC charger 210 alone is performed. In this case, by performing a charging operation using AC charger 200 together with DC charger 210, charging is expected to be completed in a shorter period of time without reducing the charging efficiency.

In the first embodiment, charging control directed to improving the charging efficiency is effected by selecting an appropriate charging scheme taking into account the state of charge of the power storage device, the specification of the charger, and the like in a vehicle that can execute both AC charging and DC charging. A charge control process of the first embodiment will be described hereinafter with reference to FIGS. 6 and 7.

FIG. 6 is a flowchart to describe in detail a charge control process executed at charging station 500 and vehicle 100 of the first embodiment. The flowchart of FIGS. 5 and 6 is realized by invoking a prestored program from the main routine in vehicle ECU 300 for vehicle 100, communication units 515 and 525 for charging station 500 of FIG. 3 and power feed ECU 550 for FIG. 4, and executing the program at a predetermined cycle. Alternatively, some of or all of the steps can be realized by processing through dedicated hardware (electronic circuit).

Referring to FIG. 6, the processing on the part of vehicle 100 will be first described. At step (hereinafter, step abbreviated as S) 200, vehicle ECU 300 determines whether connector 410 is connected to DC port 222 based on connection signal CNCT_DC.

When connector 410 is not connected to DC port 222 (NO at S200), the process of subsequent S210-S240 is skipped since DC charging cannot be performed, and control proceeds to S250.

When connector 410 is connected to DC port 222 (YES at S200), control proceeds to S210 where vehicle ECU 300 determines whether there is a DC charging initiation request by an operation of switch SW2.

When there is no DC charging initiation request (NO at S210), control proceeds to S250.

When there is a DC charging initiation request (YES at S210), control proceeds to S220 where vehicle ECU 300 activates communication unit 215. Furthermore, at S230, vehicle ECU 300 outputs a DC charging initiation request signal through cable to charging station 500. At S240, vehicle ECU 300 receives information transmitted from charging station 500 via a communication unit to determine whether DC charging is allowed or not according to the information.

Then, control proceeds to S250 where vehicle ECU 300 carries out a similar processing for the AC side, likewise with the DC side. Specifically, at S250, vehicle ECU 300 determines whether connector 410 is connected to AC port 221 based on connection signal CNCT_AC.

When connector 410 is not connected to AC port 221 (NO at S250), the process of subsequent S260-S290 is skipped since AC charging cannot be performed, and control proceeds to S300.

When connector 410 is connected to AC port 221 (YES at S250), control proceeds to S260 where vehicle ECU 300 determines whether there is an AC charging initiation request by an operation of switch SW1.

When there is no AC charging initiation request (NO at S260), control proceeds to S300.

When there is an AC charging initiation request (YES at S260), control proceeds to S270 where vehicle ECU 300 activates communication unit 205. Furthermore, at S280, vehicle ECU 300 outputs an AC charging initiation request signal to charging station 500 through cable. Then, at S290, vehicle ECU 300 receives information transmitted from charging station 500 through a communication unit to determine whether AC charging is allowed or not according to the information.

At S300, vehicle ECU 300 carries out the process that will be described afterwards with reference to FIG. 7, based on the information of whether charging is allowed or not, determined at S240 and S290.

In the case where a response signal is not received from charging station 500 within a predetermined period of time from the output of a charging initiation request signal, vehicle ECU 300 determines that charging using the relevant electric power is not allowed.

The processing at charging station 500 will be described hereinafter. At S100, charging station 500 determines whether a DC charging initiation request signal has been received from vehicle 100 through cable.

When a DC charging initiation request signal is not received (NO at S100), the process of subsequent S110-S130 is skipped, and control proceeds to S140.

When a DC charging initiation request signal is received (YES at S100), control proceeds to S110 where charging station 500 determines whether DC charging is allowed or not. A charging disallowed determination is made when the charging station inherently lacks the capability of DC charging, or when DC power cannot be supplied due to device failure.

At S120, charging station 500 activates communication unit 525, and transmits a DC charging allowed/disallowed signal to vehicle 100 through communication at S130.

Then, at S140, charging station 500 determines whether an AC charging initiation request signal is received from vehicle 100 through cable.

When an AC charging initiation request signal is not received (NO at S140), the process of subsequent S150-S170 is skipped, and control returns to the main routine.

When an AC charging initiation request signal is received (YES at S140), control proceeds to S150 where charging station 500 determines whether AC charging is allowed or not.

Then, at S160, charging station 500 activates communication unit 515 to transmit an AC charging allowed/disallowed signal to vehicle 100 through communication at S170.

Figure 7:
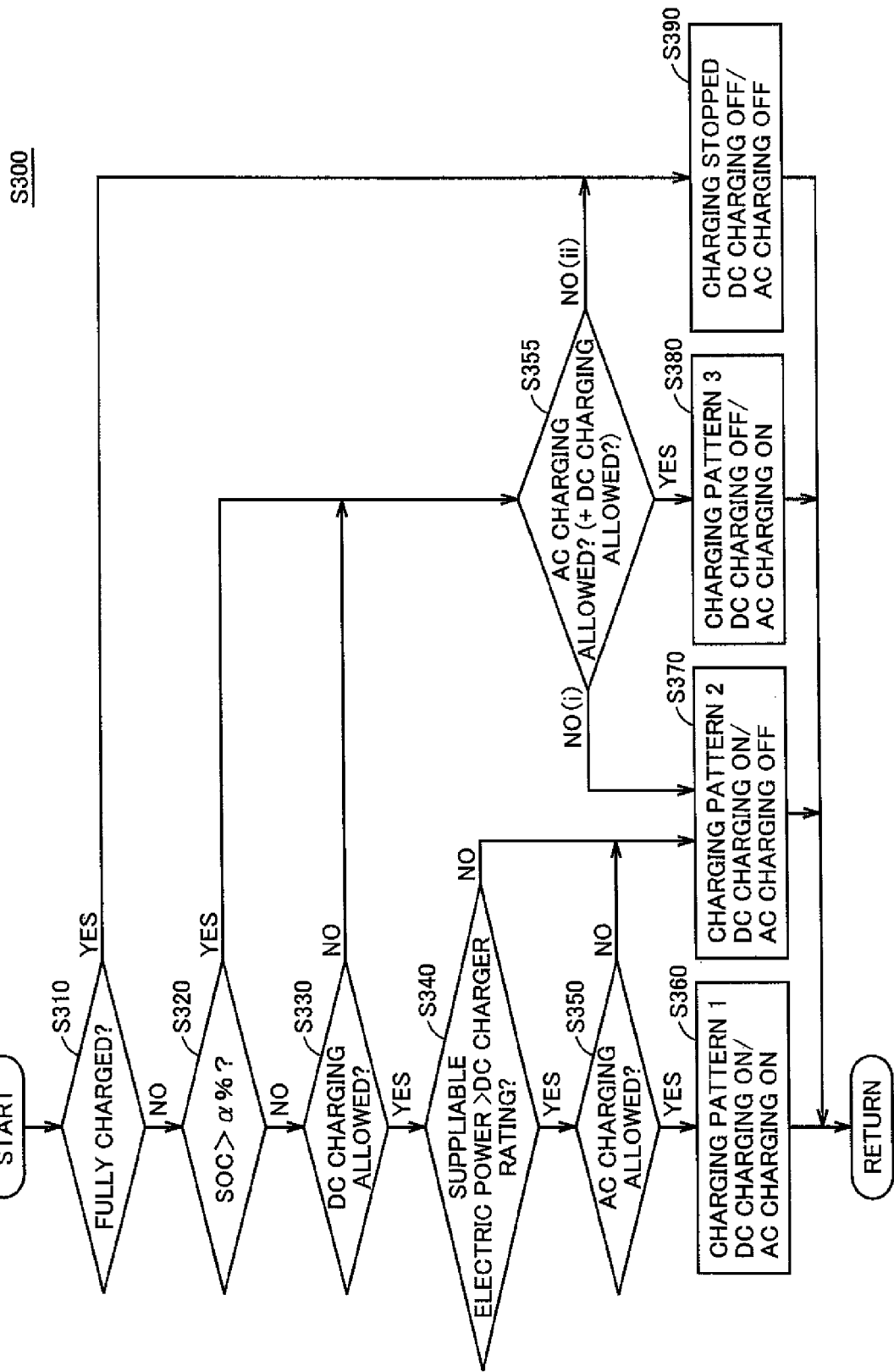
FIG. 7 is a flowchart to describe in detail the process of step S300 in FIG. 6.

FIG. 7 is a flowchart to describe in detail the process of step S300 shown in FIG. 6.

At S310, vehicle ECU 300 determines whether power storage device 110 is fully charged or not.

When power storage device 110 is fully charged (YES at S310), control proceeds to S390 since a charging operation is not required. Vehicle ECU 300 stops both DC charging and AC charging.

When power storage device 110 has not reached a fully charged state (NO at S310), control proceeds to S320 where vehicle ECU 300 determines whether the SOC is greater than predetermined reference value $\alpha$.

When the SOC is greater than predetermined reference value $\alpha$ (YES at S320), the charging efficiency will be degraded in DC charging since the charging electric power is restricted, as described above in association with FIG. 5. Therefore, control proceeds to S355 where vehicle ECU 300 determines whether AC charging is allowed or not.

When AC charging is allowed (YES at S355), control proceeds to S380 where vehicle ECU 300 stops DC charging and executes a charging operation by AC charging.

When AC charging is not allowed, vehicle ECU 300 determines whether DC charging is allowed or not. When DC charging is allowed (NO (i) at S355), control proceeds to S370 where vehicle ECU 300 executes charging by DC charging despite the efficiency being somewhat poor. If DC charging is also not allowed (NO (ii) at S355), control proceeds to S390 where the charging operation is stopped.

In the case where the SOC is less than or equal to predetermined reference value $\alpha$ (NO at S320), control proceeds to S330 where vehicle ECU 300 determines whether DC charging is allowed or not.

When DC charging is not allowed (NO at S330), control proceeds to S355 where a determination is made as to whether AC charging is allowed or not. When AC charging is allowed, control proceeds to S380 to execute AC charging; otherwise control proceeds to S390 where the charging operation is stopped.

When DC charging is allowed (YES at S330), control proceeds to S340 where vehicle ECU 300 determines whether the suppliable power capacity from charging station 500 is greater than the rating capacity of DC charger 210.

When the suppliable power capacity from charging station 500 is less than or equal to the rating capacity of DC charger 210 (NO at S340), control proceeds to S370 where vehicle ECU 300 executes DC charging under the state where AC charging is stopped since all the suppliable electric power of charging station 500 can be accepted by DC charging alone.

When the suppliable power capacity from charging station 500 is greater than the rating capacity of DC charger 210 (YES at S340), charging station 500 still has available power left even when charging is performed at the suppliable maximum power through DC charging. Therefore, control proceeds to S350. If AC charging is allowed (YES at S350), vehicle ECU 300 performs S360 to execute charging based on a combination of AC charging and DC charging. If AC charging is not allowed (NO at S350), control proceeds to S370 where vehicle ECU 300 executes charging through DC charging alone.

By control according to the processing set forth above, charging can be performed through an efficient charging scheme in consideration of the SOC of the power storage device as well as the specification of the power feed device and charger in a vehicle capable of both AC charging and DC charging.

Second Embodiment

The first embodiment was described based on a configuration in which a vehicle-mounted power storage device is charged using electric power from a power supply external to the vehicle.

Recent years have seen the study of a scheme in which a vehicle is taken as a power source in a power network such as a smart grid, and in which the electric power of a vehicle is used as a power source for a work carried out outdoors such as in the event of a disaster or during camp activity.

Since the power generated by solar light as well as the electric power obtained from a vehicle in the smart grid is DC power, research on a DC electric distribution system is conducted to allow DC power to be directly used at home in order to prevent efficiency reduction caused by power conversion. Moreover, much general electric equipment such as an electrical appliance convert (rectify) the received AC power into DC power inside the equipment. There are cases where usage of DC power is more preferable.

Thus, there is a possibility of the demand for executing the power feeding (discharge) from a vehicle (hereinafter, also simply referred to as "external discharging") in both direct current and alternating current.

The second embodiment is directed to performing discharging both by DC power (hereinafter, also referred to as "DC discharging") and by AC power (hereinafter, also referred to as "AC discharging") by setting each AC charger and DC charger as a power converter that allows power conversion bidirectionally in a vehicle capable of charging both DC power and AC power, such as that indicated in the first embodiment.

Figure 8:
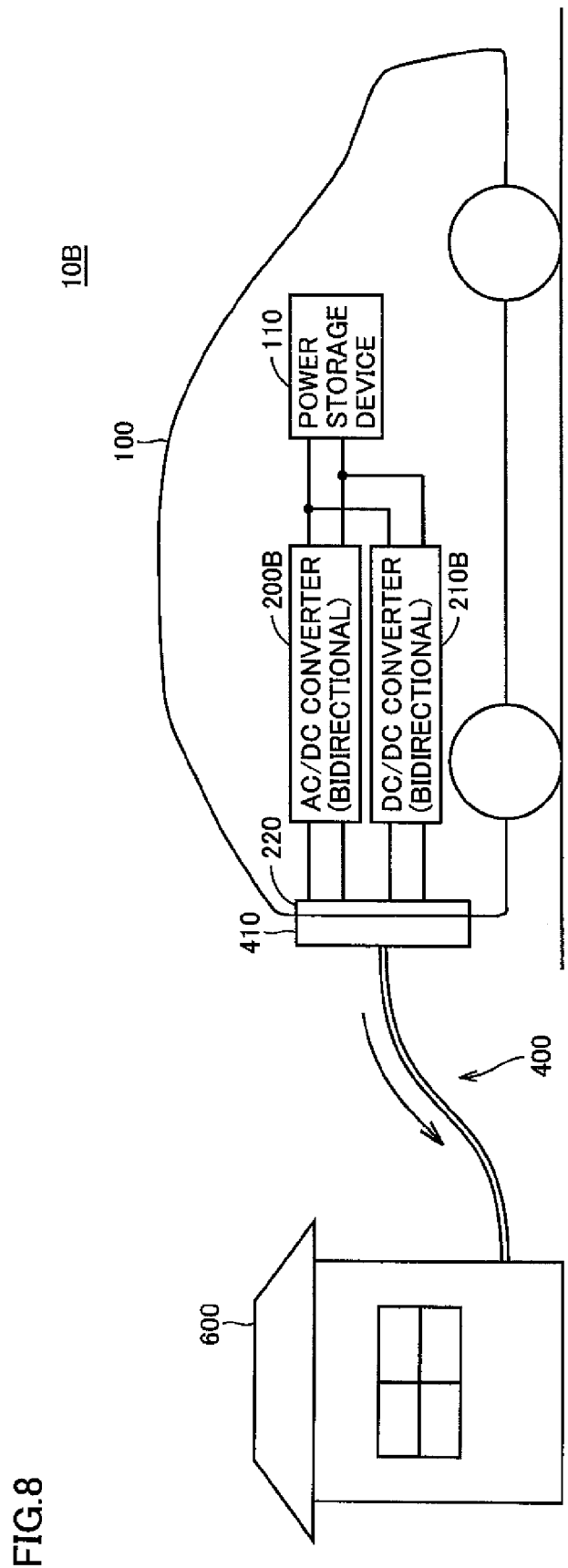
FIG. 8 is a diagram to schematically describe an electric power supply system including a vehicle according to a second embodiment.

FIG. 8 is a diagram to schematically describe an electric power supply system 10B including a vehicle 100B according to the second embodiment. Vehicle 100B of FIG. 8 corresponds to vehicle 100 or vehicle 100A set forth in the first embodiment, including an AC/DC converter 200B and a DC/DC converter 210B capable of power conversion bidirectionally, instead of AC charger 200 and DC charger 210, respectively. Electric power is supplied from vehicle 100B to a house 600 via an electric power cable 400. A configuration in which electric power is supplied onto an electric power network or to another vehicle via the charging station shown in the first embodiment is also contemplated.

Figure 9:
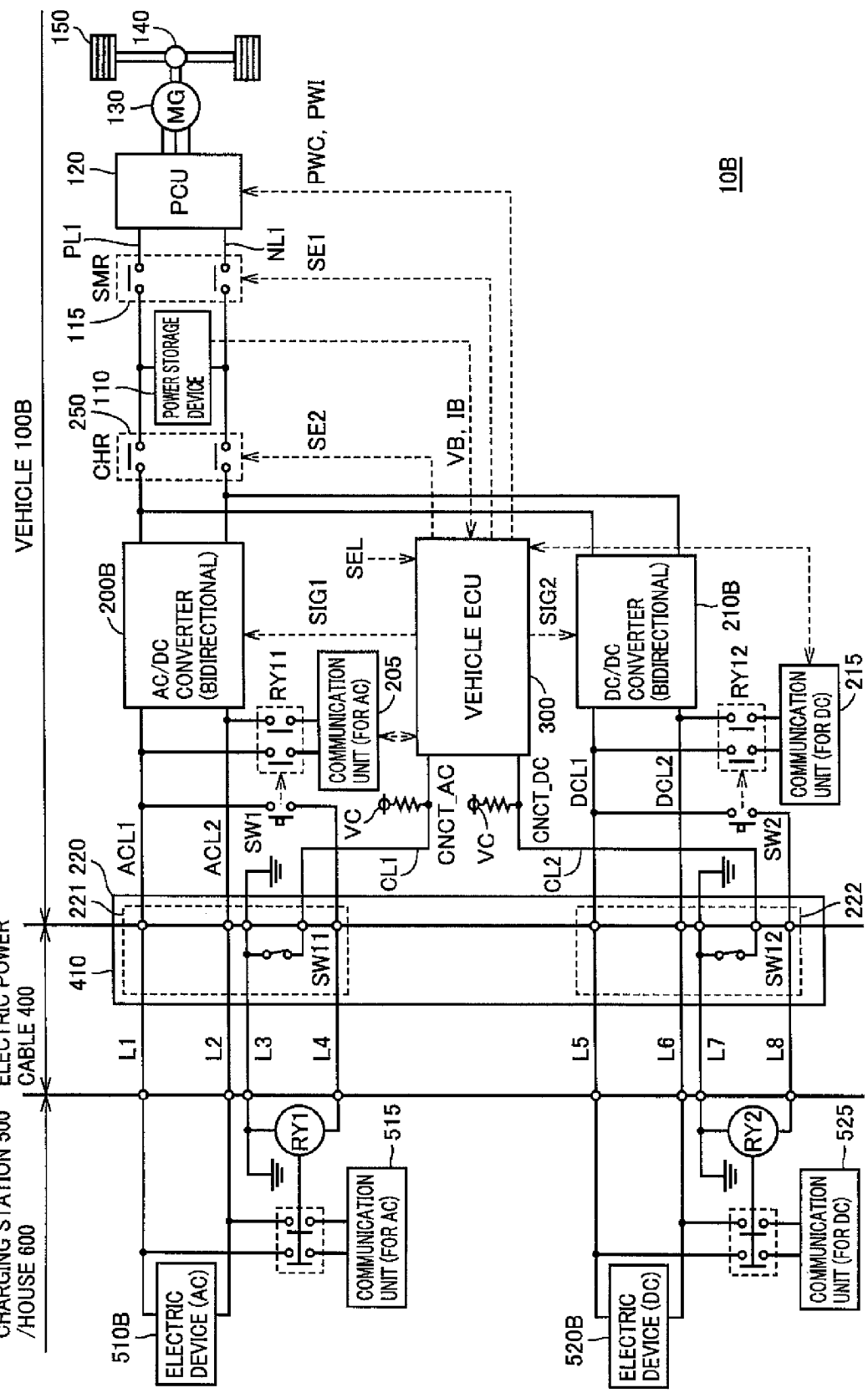
FIG. 9 is an entire block diagram of an electric power supply system including a vehicle according to the second embodiment.

FIG. 9 is an entire block diagram of electric power supply system 10B including vehicle 100B of the second embodiment. Vehicle 100B corresponds to vehicle 100 or vehicle 100A of the first embodiment having AC charger 200 and DC charger 210 replaced with AC/DC converter 200B and DC/DC converter 210B capable of power conversion bidirectionally. Elements similar to those in FIG. 3 will not be described again in FIG. 9.

Vehicle ECU 300 receives a selection signal SEL to select either a charging mode of external charging or a discharging mode of external charging through an operation by the user.

AC/DC converter 200B is controlled by a control signal SIG1 from vehicle ECU 300 to convert, when in a charging mode, AC power from an external power supply into DC power to charge power storage device 110. When in a discharging mode, the DC power from power storage device 110, or the power generated at motor generator 130 and converted into DC power at PCU 120 is converted into AC power to be output to charging station 500 or house 600 via electric power cable 400.

DC/DC converter 210B is controlled by a control signal SIG2 from vehicle ECU 300 to convert, when in a charging mode, the DC power from an external power supply to a voltage suitable to charge power storage device 110 for charging thereof. When in a discharging mode, the DC power from power storage device 110, or the DC power that is a converted version of the electric power generated by motor generator 130 is converted into a voltage suitable to the specification or rating of the output destination, and the converted voltage is output to charging station 500 or to house 600.

At charging station 500 or house 600, the electric power supplied from vehicle 100B is delivered to an AC electric device 510B and a DC electric device 520B.

In the second embodiment, communication between vehicle 100B and charging station 500 may be performed using communication means other than PLC, as described with reference to FIG. 4 in the first embodiment.

FIG. 10 is a flowchart to describe in detail a discharge control process executed at charging station 500 (or house 600) and vehicle 100B in the second embodiment. For the sake of simplification in FIG. 10, the case where the power reception side is charging station 500 will be described.

Referring to FIG. 10, first the processing on the part of vehicle 100 will be described. At step (hereinafter, step abbreviated as S) 600, vehicle ECU 300 determines whether connector 410 is connected to DC port 222 based on a connection signal CNCT_DC.

When connector 410 is not connected to DC port 222 (NO at S600), the process of subsequent S610-S640 is skipped since DC discharging cannot be performed, and control proceeds to S650.

When connector 410 is connected to DC port 222 (YES at S600), control proceeds to S610 where vehicle ECU 300 determines whether there is a DC discharging initiation request by an operation of switch SW2.

When there is no DC discharging initiation request (NO at S610), control proceeds to S650.

When there is a DC discharging initiation request (YES at S610), control proceeds to S620 where vehicle ECU 300 activates communication unit 215. Furthermore, at S630, vehicle ECU 300 outputs a DC discharging initiation request signal through cable to charging station 500. At S640, vehicle ECU 300 receives information transmitted from charging station 500 via a communication unit to determine whether DC discharging is allowed or not according to the information.

Then, control proceeds to S650 where vehicle ECU 300 carries out a similar processing for the AC side, likewise with the DC side. Specifically, at S650, vehicle ECU 300 determines whether connector 410 is connected to AC port 221 based on connection signal CNCT_AC.

When connector 410 is not connected to AC port 221 (NO at S650), the process of subsequent S660-S690 is skipped since AC discharging cannot be performed, and control proceeds to S700.

When connector 410 is connected to AC port 221 (YES at S650), control proceeds to S660 where vehicle ECU 300 determines whether there is an AC discharging initiation request by an operation of switch SW1.

When there is no AC discharging initiation request (NO at S660), control proceeds to S700.

When there is an AC discharging initiation request (YES at S660), control proceeds to S670 where vehicle ECU 300 activates communication unit 205. Furthermore, at S680, vehicle ECU 300 outputs an AC discharging initiation request signal to charging station 500 through cable. Then, at S690, vehicle ECU 300 receives information transmitted from charging station 500 through a communication unit to determine whether AC discharging is allowed or not according to the information.

At S700, vehicle ECU 300 carries out the process that will be described afterwards with reference to FIG. 11, based on the information of whether discharging is allowed or not, determined at S640 and S690.

In the case where a response signal is not received from charging station 500 within a predetermined period of time from the output of a discharging initiation request signal, vehicle ECU 300 determines that discharging using the relevant electric power is not allowed.

The processing at charging station 500 will be described hereinafter. At S500, charging station 500 determines whether a DC discharging initiation request signal has been received from vehicle 100 through cable.

When a DC discharging initiation request signal is not received (NO at S500), the process of subsequent S510-S530 is skipped, and control proceeds to S540.

When a DC discharging initiation request signal is received (YES at S500), control proceeds to S510 where charging station 500 determines whether DC discharging is allowed or not.

At S520, charging station 500 activates communication unit 525, and transmits a DC discharging allowed/disallowed signal to vehicle 100 through communication at S530.

Then, at S540, charging station 500 determines whether an AC discharging initiation request signal is received from vehicle 100 through cable.

When an AC discharging initiation request signal is not received (NO at S540), the process of subsequent S550-S570 is skipped, and control returns to the main routine.

When an AC discharging initiation request signal is received (YES at S540), control proceeds to S550 where charging station 500 determines whether AC discharging is allowed or not.

Then, at S560, charging station 500 activates communication unit 515 to transmit an AC discharging allowed/disallowed signal to vehicle 100 through communication at S570.

Figure 11:
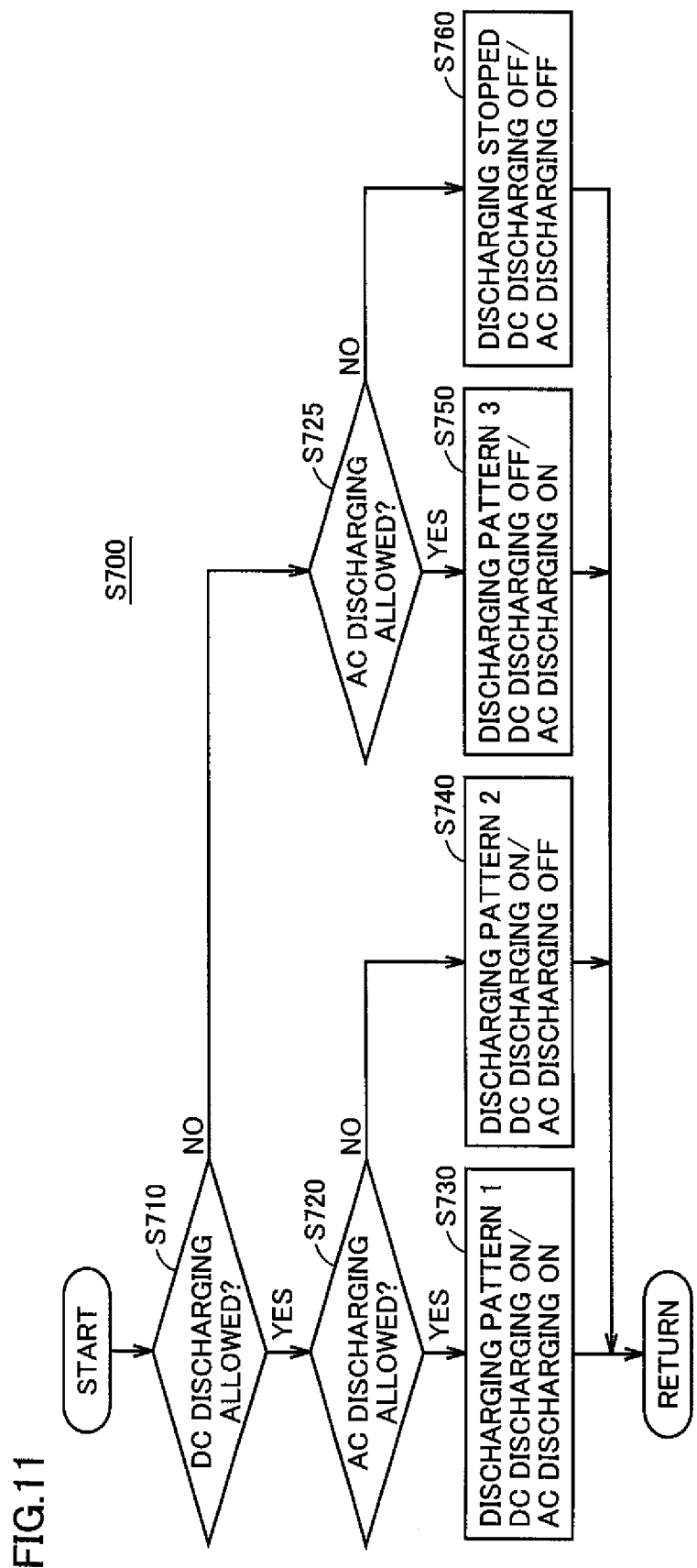
FIG. 11 is a flowchart to describe in detail the process of step S700 in FIG. 10.

FIG. 11 is a flowchart to describe in detail the process of step S700 shown in FIG. 10.

At S710 in FIG. 11, vehicle ECU 300 determines whether DC charging is allowed or not.

When DC charging is allowed (YES at S710), control proceeds to S720 where vehicle ECU 300 determines whether AC discharging is then allowed or not.

When AC discharging is allowed (YES at S720), control proceeds to S730 where vehicle ECU 300 executes both DC discharging and AC discharging.

When AC discharging is not allowed (NO at S720), control proceeds to S740 where vehicle ECU 300 executes DC discharging alone in a state with AC discharging stopped.

When DC discharging is not allowed at S710 (NO at S710), control proceeds to S725 where vehicle ECU 300 determines whether AC discharging is allowed or not.

When AC discharging is allowed (YES at S725), control proceeds to S750 where vehicle ECU 300 executes AC discharging alone in a state with DC discharging stopped.

When AC discharging is not allowed (NO at S725), control proceeds to S760 where vehicle ECU 300 stops both DC discharging and AC discharging since both DC and AC discharging are not allowed.

By effecting control according to the process set forth above, the discharging scheme can be selected appropriately based on the state of the power supply destination in a vehicle capable of both AC discharging and DC discharging.

When external charging is to be carried out at vehicle 100B of the second embodiment, the control described in the first embodiment can be applied.

Third Embodiment

The second embodiment has been described based on a configuration in which one of a charging mode and discharging mode is selected by a selection from the user.

Since vehicle 100B of FIG. 9 is capable of charging and discharging in direct current and in alternating current, a configuration in which charging is performed at one side while discharging is performed at the other is allowed. The third embodiment is directed to a configuration in which a charging operation and a discharging operation can be combined in a vehicle capable of charging and discharging in direct current and alternating current.

Such a configuration allows supply of AC power utilizing vehicle 100B as an inverter while receiving the electric power generated at a solar cell panel or the DC power from another battery.

Alternatively, power supply for a long period of time is allowed when DC power is supplied, by supplying DC power while receiving AC power from a commercial power supply.

In this case, based on a configuration of an electric power supply system similar to that shown in FIG. 9, not only a charging mode and discharging mode, but also a DC charging/AC discharging mode and a DC discharging/AC charging mode can be selected by a selection signal SEL input to vehicle ECU 300 through a user's operation.

Based on selection signal SEL by the user, vehicle ECU 300 determines whether to carry out a charging operation or a discharging operation for each of the direct current side and alternating current side.

Figure 12:
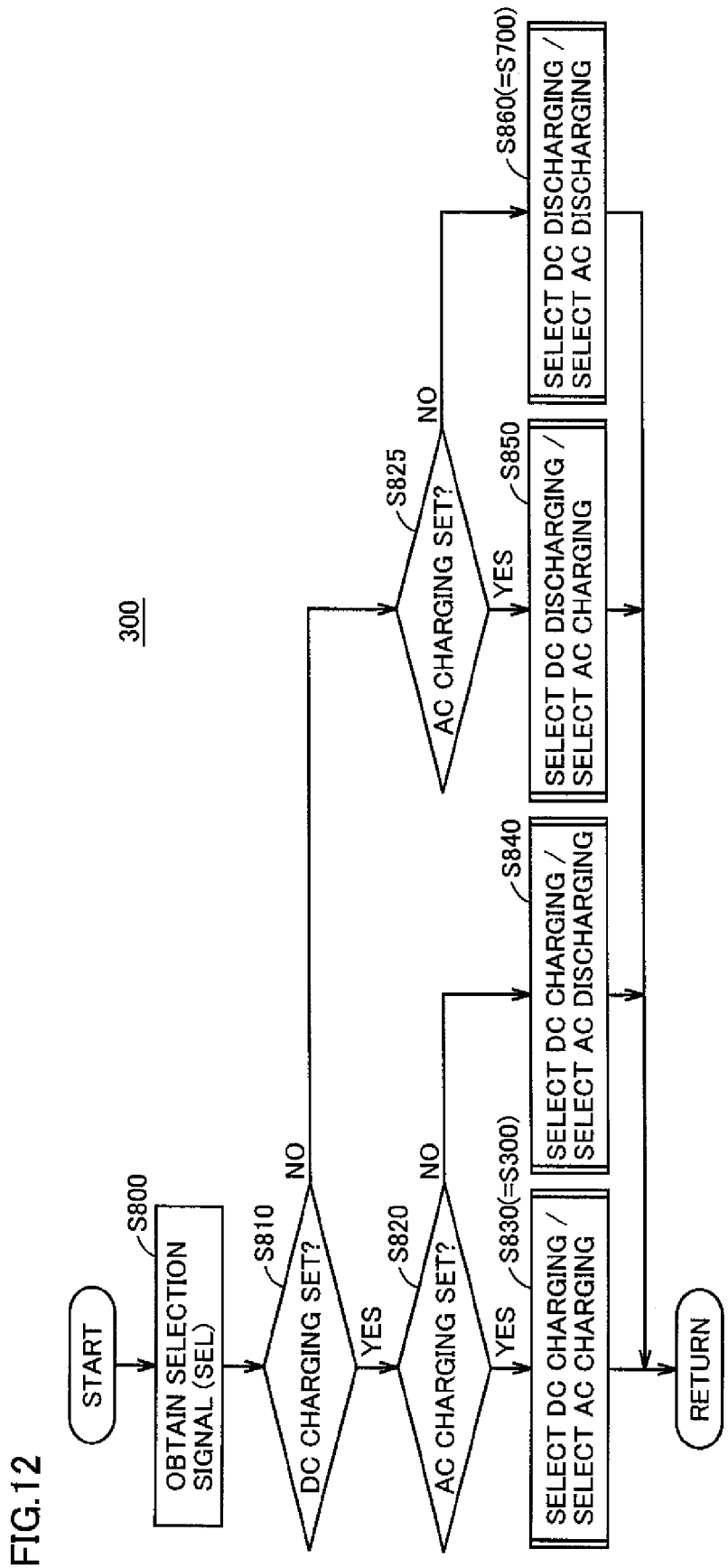
FIG. 12 is a flowchart to describe in detail a charge/discharge selection control process in a third embodiment.

FIG. 12 is a flowchart to describe in detail a charging/discharging selection control process executed at vehicle ECU 300 in the third embodiment.

At S800 in FIG. 12, vehicle ECU 300 obtains selection signal SEL through an operation by the user.

At S810, vehicle ECU 300 determines whether DC charging is set in selection signal SEL.

When DC charging is set (YES at S810), control proceeds to S820 where vehicle ECU 300 determines whether AC charging is set in selection signal SEL.

When AC charging is set (YES at S820), control proceeds to S830 where vehicle ECU 300 selects and executes charging control such that a charging operation is performed at both the direct current side and alternating current side. Specifically for this S830, the process of FIG. 7 shown in the first embodiment is executed.

When AC charging is not set (NO at S820), i.e. AC discharging is set, control proceeds to S840 where vehicle ECU 300 selects the performance of a charging operation at the direct current side and a discharging operation at the alternating current side to execute charging/discharging control as will be described afterwards with reference to FIG. 13.

When DC charging is not set at S810 (NO at S810), vehicle ECU 300 determines that DC discharging is set. Thus, control proceeds to S825 where vehicle ECU 300 determines whether AC charging is set in selection signal SEL.

When AC charging is set (YES at S825), control proceeds to S850 where vehicle ECU 300 selects the performance of a discharging operation at the direct current side and a charging operation at the alternating current side to execute charging/discharging control as will be described afterwards with reference to FIG. 14.

When AC charging is not set (NO at S825), vehicle ECU 300 determines that the performance of a discharging operation is set for both the direct current side and alternating current side. Then, control proceeds to S860 where vehicle ECU 300 selects the performance of a discharging operation at both the direct current side and alternating current side to execute discharging control. Specifically for this S860, the process of FIG. 11 indicated in the second embodiment is executed.

Figure 13:
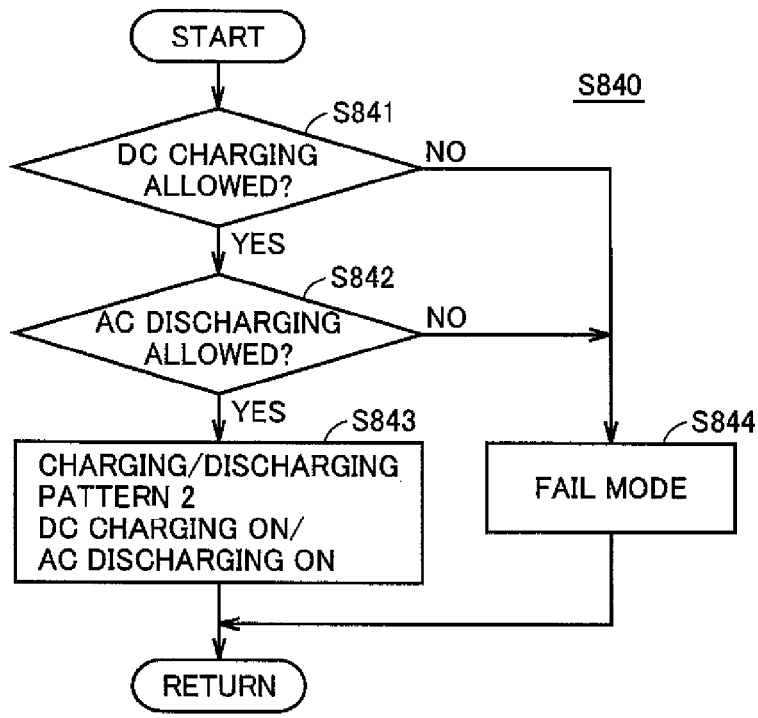
FIG. 13 is a flowchart to describe in detail the process of step S840 in FIG. 12.

FIG. 13 is a flowchart to describe in detail the process of step S840 in FIG. 12.

At S841 in FIG. 13, vehicle ECU 300 determines whether DC charging is allowed or not based on the allowed/disallowed DC charging information determined through a process similar to that shown in FIG. 6.

When DC charging is allowed (YES at S841), control proceeds to S842 where a determination is made as to whether AC discharging is allowed or not based on the allowed/disallowed AC discharging information determined through a process similar to that shown in FIG. 10.

When AC discharging is allowed (YES at S842), control proceeds to S843 where vehicle ECU 300 controls AC/DC converter 200B and DC/DC converter 210B such that AC discharging is performed while DC charging is performed.

When DC charging is not allowed (NO at S841), or when AC discharging is not allowed (NO at S842), control proceeds to S844 where vehicle ECU 300 sets a fail mode since the mode selected by the user cannot be executed. In a fail mode, a process to notify the user that the desired mode could not be performed by means of a display, an alarm, or the like is carried out.

Figure 14:
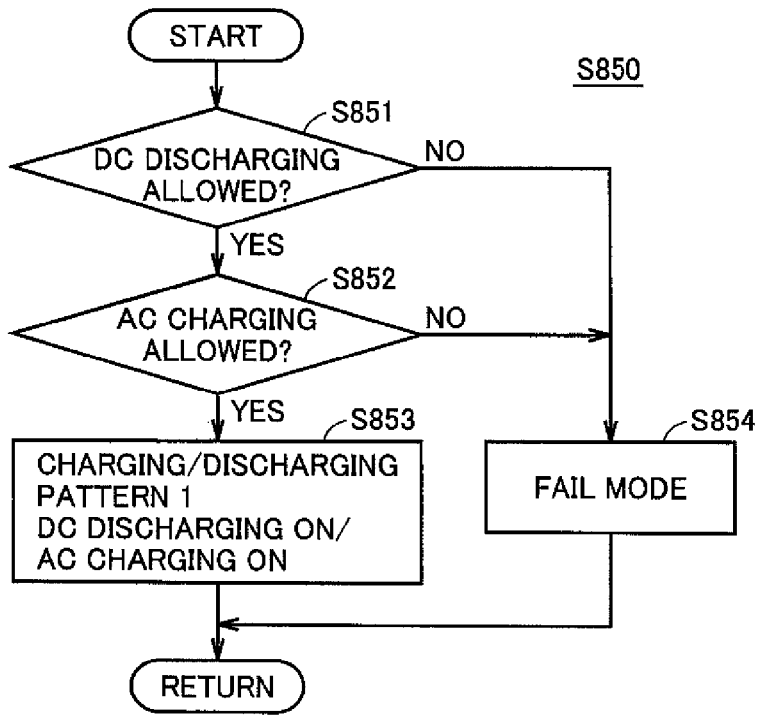
FIG. 14 is a flowchart to describe in detail the process of step S850 in FIG. 12.

FIG. 14 is a flowchart to describe in detail the process of step S850 shown in FIG. 12.

At S851 in FIG. 14, vehicle ECU 300 determines whether DC discharging is allowed or not based on the allowed/disallowed DC discharging information determined through a process similar to that shown in FIG. 10.

When DC discharging is allowed (YES at S851), control proceeds to S852 where a determination is made as to whether AC charging is allowed or not based on the allowed/disallowed AC charging information determined through a process similar to that shown in FIG. 6.

When AC charging is allowed (YES at S852), control proceeds to S853 where vehicle ECU 300 controls AC/DC converter 200B and DC/DC converter 210B such that DC discharging is performed while AC charging while is performed.

When DC discharging is not allowed (NO at S851), or when AC charging is not allowed (NO at S852), control proceeds to S854 where vehicle ECU 300 sets a fail mode since the mode selected by the user cannot be executed.

By effecting control according to the process set forth above, selection of a charging and discharging mode according to a selection by the user is allowed in a vehicle capable of both AC charging/discharging and DC charging/discharging.

FIG. 15 summarizes the usage state of each port, advantage, and selection condition of the relevant pattern for each of the operation modes described in the first to third embodiments. Description of each item will not be repeated.

It should be understood that the embodiments disclosed herein are illustrative and non-restrictive in every respect. The scope of the present invention is defined by the terms of the claims, rather than the description of the embodiments set forth above, and is intended to include any modifications within the scope and meaning equivalent to the terms of the claims.

REFERENCE SIGNS LIST 10, 10B electric power supply system; 100, 100A, 100B vehicle; 110 power storage device; 115 SMR; 120 PCU; 130 motor generator; 140 power transmission gear; 150 driving wheel; 200 AC charger; 200B AC/DC converter; 205, 215, 230, 515, 525, 530 communication unit; 210 DC charger; 210B DC/DC converter; 220 inlet; 221 AC port; 222 DC port; 250 CHR; 300 vehicle ECU; 400 electric power cable; 410 connector; 500, 500A charging station; 510 AC power supply; 510B, 520B electric device; 520 DC power supply; 550 power feed ECU; 600 establishment; ACL1, ACL2, DCL1, DCL2, L1, L2, L5, L6, PL1, NL1 power line; CL1, CL2 signal line; L3, L7 ground line; L4, L8 communication line; RY1, RY2, RY10-RY12, RY20 relay; SW1, SW2, SW11, SW12 switch; T1-T5, T11-T14 terminal; VC power supply node.

The invention claimed is:

1. A vehicle capable of charging a power storage device mounted on the vehicle using electric power from two electric power paths of an external DC power supply and AC power supply, the vehicle comprising:
a first power conversion device configured to convert electric power from the DC power supply into charging electric power for the power storage device,
a second power conversion device configured to convert electric power from the AC power supply into charging electric power for the power storage device, and
a control device configured to control the first power conversion device and the second power conversion device,
the control device selecting an electric power path to be used for charging based on a state of the power storage device, and efficiency of the first power conversion device and the second power conversion device.

2. The vehicle according to claim 1, wherein the first power conversion device has a rating capacity greater than a rating capacity of the second power conversion device.

3. The vehicle according to claim 2, wherein the control device selects an electric power path such that charging is performed using electric power from at least the DC power supply when a state of charge of the power storage device is lower than a predetermined threshold value, and such that charging is performed using electric power from the AC power supply when the state of charge exceeds the predetermined threshold value.

4. The vehicle according to claim 3, wherein the control device performs charging using both electric power from the DC power supply and electric power from the AC power supply when the state of charge is lower than the predetermined threshold value.

5. The vehicle according to claim 2, wherein the control device selects an electric power path such that charging is performed using electric power from at least the DC power supply when acceptable charging power for the power storage device exceeds a predetermined threshold value, and such that charging is performed using electric power from the AC power supply when the acceptable charging power is lower than the predetermined threshold value.

6. The vehicle according to claim 5, wherein the control device performs charging using electric power from both the DC power supply and the AC power supply when the acceptable charging power exceeds the predetermined threshold value.

7. The vehicle according to claim 2, wherein
electric power is supplied from a power feed device including the DC power supply and the AC power supply,
the control device can transmit/receive information to/from the power feed device, and
the control device selects an electric power path such that charging is performed using electric power from the AC power supply in addition to electric power from the DC power supply, when a value indicating electric power feeding capability of the power feed device included in the information received from the power feed device exceeds the rating capacity of the first power conversion device.

8. The vehicle according to claim 7, wherein the control device transmits/receives information to/from the power feed device through an information transmission path using communication and an information transmission path using cable, differing from the information transmission path using communication.

9. The vehicle according to claim 8, wherein the information transmission using communication is performed using a power line communication.

10. The vehicle according to claim 8, wherein the information transmission using communication is carried out using wireless communication.

11. The vehicle according to claim 8, wherein the information transmission from the vehicle to the power feed device is conducted through the information transmission path using cable, whereas information transmission from the power feed device to the vehicle is conducted through the information transmission path using communication.

12. The vehicle according to claim 1, wherein
electric power from the DC power supply and the AC power supply is transmitted via an electric power cable,
the vehicle further comprising a connection portion for connecting a connector of the electric power cable,
the connection portion includes a DC port for receiving electric power from the DC power supply, and an AC port for receiving electric power from the AC power supply.

13. The vehicle according to claim 12, wherein the connector is formed including a first terminal group for transmitting electric power from the DC power supply and a second terminal group for transmitting electric power from the AC power supply, the first terminal group and the second terminal group are electrically connected to the DC port and the AC port, respectively, by the connector being connected with the connection portion.

14. The vehicle according to claim 1, wherein
the vehicle is further capable of supplying electric power from the power storage device to an exterior of the vehicle,
the first power conversion device is configured to convert electric power from the power storage device to allow supply of DC power to the exterior, and
the second power conversion device is configured to convert electric power from the power storage device to allow supply of AC power to the exterior.

15. The vehicle according to claim 14, wherein the control device uses electric power from the DC power supply to charge the power storage device, and uses the second power conversion device to convert electric power from the power storage device, and supply AC power to the exterior.

16. The vehicle according to claim 14, wherein the control device uses electric power from the AC power supply to charge the power storage device, and uses the first power conversion device to convert the electric power from the power storage device, and supply DC power to the exterior.

17. The vehicle according to claim 9, wherein the information transmission from the vehicle to the power feed device is conducted through the information transmission path using cable, whereas information transmission from the power feed device to the vehicle is conducted through the information transmission path using communication.

18. The vehicle according to claim 10, wherein the information transmission from the vehicle to the power feed device is conducted through the information transmission path using cable, whereas information transmission from the power feed device to the vehicle is conducted through the information transmission path using communication.

* * * * *